(12) United States Patent
Okita

(10) Patent No.: US 10,394,727 B2
(45) Date of Patent: Aug. 27, 2019

(54) SEMICONDUCTOR MEMORY DEVICE WITH DATA BUFFERING

(71) Applicant: Toshiba Memory Corporation, Tokyo (JP)

(72) Inventor: Kazuhito Okita, Ota Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 15/694,973

(22) Filed: Sep. 4, 2017

(65) Prior Publication Data

US 2018/0196768 A1  Jul. 12, 2018

(30) Foreign Application Priority Data

Jan. 11, 2017 (JP) ................. 2017-002767

(51) Int. Cl.
*G06F 13/18* (2006.01)
*G06F 13/16* (2006.01)
*G06F 3/06* (2006.01)
*G06F 13/42* (2006.01)

(52) U.S. Cl.
CPC .............. *G06F 13/18* (2013.01); *G06F 3/067* (2013.01); *G06F 3/0611* (2013.01); *G06F 3/0659* (2013.01); *G06F 13/1605* (2013.01); *G06F 13/4282* (2013.01)

(58) Field of Classification Search
CPC .................................................. G06F 3/0611
See application file for complete search history.

(56) References Cited

U.S. PATENT DOCUMENTS

| 8,654,596 | B2 * | 2/2014 | Hoya ................... | G11C 7/1006 365/158 |
| 8,732,357 | B2 | 5/2014 | Klein et al. | |
| 8,856,405 | B2 | 10/2014 | Suzuki et al. | |
| 9,195,626 | B2 | 11/2015 | Pandit et al. | |
| 9,760,433 | B2 * | 9/2017 | Yang ................... | G06F 11/1044 |
| 2012/0311236 | A1 | 12/2012 | Ohshima | |
| 2013/0067147 | A1 * | 3/2013 | Okita ................... | G06F 12/0246 711/103 |

FOREIGN PATENT DOCUMENTS

| JP | 2012-252416 A | 12/2012 |
| JP | 2013-061795 A | 4/2013 |
| JP | 5308602 B1 | 10/2013 |
| JP | 5842639 B2 | 1/2016 |

\* cited by examiner

*Primary Examiner* — Henry Tsai
*Assistant Examiner* — Juanito Borromeo
(74) *Attorney, Agent, or Firm* — Kim & Stewart LLP

(57) ABSTRACT

A semiconductor storage device includes at least two nonvolatile semiconductor memories, a buffer in which data received from a host and to be written to the nonvolatile semiconductor memories in response to a write command received from the host can be temporarily stored, and a controller connected to the nonvolatile semiconductor memories and configured to transfer data stored in the buffer to a number N of the nonvolatile semiconductor memories in parallel. The number N is set according to a reception of data from the host, and N is greater than or equal to 1 and less than or equal to m, which is the number of nonvolatile semiconductor memories connected to the controller.

16 Claims, 18 Drawing Sheets

FIG. 4

| | 155 | 156 |
|---|---|---|
| [DW0] | IPTT | TYPE |
| [DW1] | LBA | 157 |
| [DW2] | TOTAL AMOUNT OF TRANSFERS | 158 |
| [DW3] | SCHEDULED AMOUNT OF TRANSMISSIONS/RECEPTIONS | 159 |
| [DW4] | FLAG | 160 |
| [DW5] | FLAG | 161 |
| [DW6] | FLAG | 162 |
| [DW7] | FLAG | 163 |

152

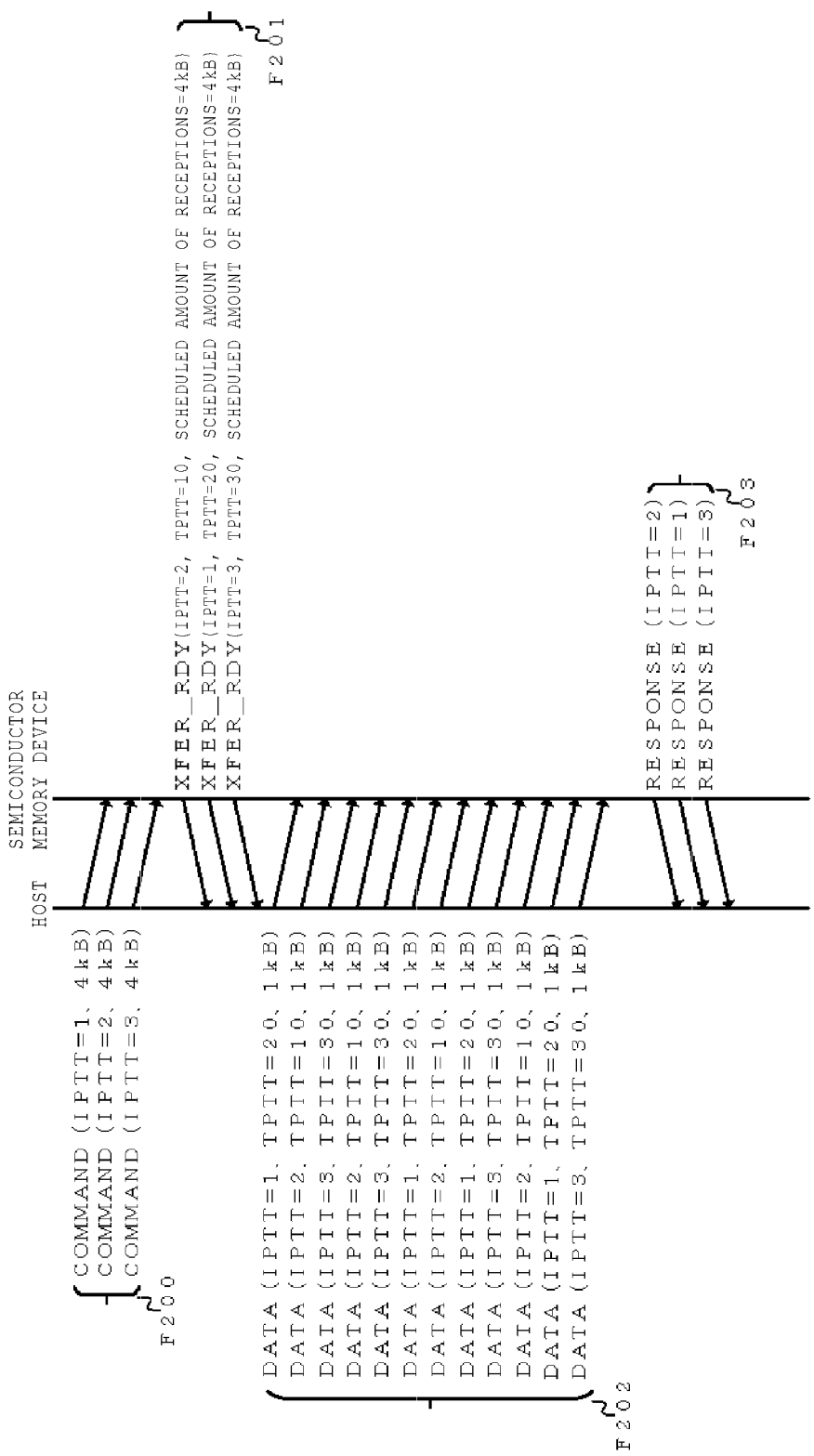

| | 620 | 600 | | | | | | | | | | 630 | | | | | |
|---|---|---|---|---|---|---|---|---|---|---|---|---|---|---|---|---|---|
| Ch0 | 0 | 18 | 36 | 54 | 72 | 90 | 108 | 126 | 144 | 162 | 180 | 198 | 216 | 234 | 252 | 270 |
| Ch1 | 1 | 19 | 37 | 55 | 73 | 91 | 109 | 127 | 145 | 163 | 181 | 199 | 217 | 235 | 253 | 271 |
| Ch2 | 2 | 20 | 38 | 56 | 74 | 92 | 110 | 128 | 146 | 164 | 182 | 200 | 218 | 236 | 254 | 272 |
| Ch3 | 3 | 21 | 39 | 57 | 75 | 93 | 111 | 129 | 147 | 165 | 183 | 201 | 219 | 237 | 255 | 273 |
| Ch4 | 4 | 22 | 40 | 58 | 76 | 94 | 112 | 130 | 148 | 166 | 184 | 202 | 220 | 238 | 256 | 274 |
| Ch5 | 5 | 23 | 41 | 59 | 77 | 95 | 113 | 131 | 149 | 167 | 185 | 203 | 221 | 239 | 257 | 275 |
| Ch6 | 6 | 24 | 42 | 60 | 78 | 96 | 114 | 132 | 150 | 168 | 186 | 204 | 222 | 240 | 258 | 276 |
| Ch7 | 7 | 25 | 43 | 61 | 79 | 97 | 115 | 133 | 151 | 169 | 187 | 205 | 223 | 241 | 259 | 277 |
| Ch8 | 8 | 26 | 44 | 62 | 80 | 98 | 116 | 134 | 152 | 170 | 188 | 206 | 224 | 242 | 260 | 278 |
| Ch9 | 9 | 27 | 45 | 63 | 81 | 99 | 117 | 135 | 153 | 171 | 189 | 207 | 225 | 243 | 261 | 279 |
| Ch10 | 10 | 28 | 46 | 64 | 82 | 100 | 118 | 136 | 154 | 172 | 190 | 208 | 226 | 244 | 262 | 280 |
| Ch11 | 11 | 29 | 47 | 65 | 83 | 101 | 119 | 137 | 155 | 173 | 191 | 209 | 227 | 245 | 263 | 281 |
| Ch12 | 12 | 30 | 48 | 66 | 84 | 102 | 120 | 138 | 156 | 174 | 192 | 210 | 228 | 246 | 264 | 282 |
| Ch13 | 13 | 31 | 49 | 67 | 85 | 103 | 121 | 139 | 157 | 175 | 193 | 211 | 229 | 247 | 265 | 283 |
| Ch14 | 14 | 32 | 50 | 68 | 86 | 104 | 122 | 140 | 158 | 176 | 194 | 212 | 230 | 248 | 266 | 284 |
| Ch15 | 15 | 33 | 51 | 69 | 87 | 105 | 123 | 141 | 159 | 177 | 195 | 213 | 231 | 249 | 267 | 285 |
| Ch16 | 16 | 34 | 52 | 70 | 88 | 106 | 124 | 142 | 160 | 178 | 196 | 214 | 232 | 250 | 268 | 286 |
| Ch17 | 17 | 35 | 53 | 71 | 89 | 107 | 125 | 143 | 161 | 179 | 197 | 215 | 233 | 251 | 269 | 287 |

FIG. 21A

| WtCnt | MCO |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 21 |
| 22 | 22 |
| 23 | 23 |
| 24 | 24 |
| 25 | 25 |
| 26 | 26 |
| 27 | 27 |
| 28 | 28 |
| 29 | 29 |
| 30 | 30 |
| 31 | 31 |
| 32 | 32 |
| 33 | 33 |
| 34 | 34 |
| 35 | 35 |
| ... | ... |
| 135 | 135 |
| 136 | 136 |
| 137 | 137 |
| 138 | 138 |
| 139 | 139 |
| 140 | 140 |
| 141 | 141 |
| 142 | 142 |
| 143 | 143 |

(660a)

| WtCnt | MCO |
|---|---|
| 144 | 144 |
| 145 | 145 |
| 146 | 146 |
| 147 | 147 |
| 148 | 148 |
| 149 | 149 |
| 150 | 150 |
| 151 | 151 |
| 152 | 152 |
| 153 | 153 |
| 154 | 154 |
| 155 | 155 |
| 156 | 156 |
| 157 | 157 |
| 158 | 158 |
| 159 | 159 |
| 160 | 160 |
| 161 | 161 |
| 162 | 162 |
| 163 | 163 |
| 164 | 164 |
| 165 | 165 |
| 166 | 166 |
| 167 | 167 |
| 168 | 168 |
| 169 | 169 |
| 170 | 170 |
| 171 | 171 |
| 172 | 172 |
| 173 | 173 |
| 174 | 174 |
| 175 | 175 |
| 176 | 176 |
| 177 | 177 |
| 178 | 178 |
| 179 | 179 |
| ... | ... |
| 279 | 279 |
| 280 | 280 |
| 281 | 281 |
| 282 | 282 |
| 283 | 283 |
| 284 | 284 |
| 285 | 285 |
| 286 | 286 |
| 287 | 287 |

| WtCnt | MCO |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 15 |
| 10 | 18 |
| 11 | 20 |
| 12 | 21 |
| 13 | 22 |
| 14 | 23 |
| 15 | 24 |
| 16 | 25 |
| 17 | 26 |
| 18 | 36 |
| 19 | 37 |
| 20 | 38 |
| 21 | 39 |
| 22 | 40 |
| 23 | 41 |
| 24 | 42 |
| 25 | 43 |
| 26 | 44 |
| 27 | 54 |
| 28 | 55 |
| 29 | 56 |
| 30 | 57 |
| 31 | 58 |
| 32 | 59 |
| 33 | 60 |
| 34 | 61 |
| 35 | 62 |
| ... | ... |
| 135 | 270 |
| 136 | 271 |
| 137 | 272 |
| 138 | 273 |
| 139 | 274 |
| 140 | 275 |
| 141 | 276 |
| 142 | 277 |
| 143 | 278 |

| WtCnt | MCO |
|---|---|
| 144 | 9 |
| 145 | 10 |
| 146 | 11 |
| 147 | 12 |
| 148 | 13 |
| 149 | 14 |
| 150 | 15 |
| 151 | 16 |
| 152 | 17 |
| 153 | 17 |
| 154 | 28 |
| 155 | 29 |
| 156 | 30 |
| 157 | 31 |
| 158 | 32 |
| 159 | 33 |
| 160 | 34 |
| 161 | 35 |
| 162 | 45 |
| 163 | 46 |
| 164 | 47 |
| 165 | 48 |
| 166 | 49 |
| 167 | 50 |
| 168 | 51 |
| 169 | 52 |
| 170 | 53 |
| 171 | 63 |
| 172 | 64 |
| 173 | 65 |
| 174 | 66 |
| 175 | 67 |
| 176 | 68 |
| 177 | 69 |
| 178 | 70 |
| 179 | 71 |
| ... | ... |
| 279 | 279 |
| 280 | 280 |
| 281 | 281 |
| 282 | 282 |
| 283 | 283 |
| 284 | 284 |
| 285 | 285 |
| 286 | 286 |
| 287 | 287 |

FIG. 21C

| WtCnt | MCO |
|---|---|
| 0 | 0 |
| 1 | 18 |
| 2 | 36 |
| 3 | 54 |
| 4 | 72 |
| 5 | 90 |
| 6 | 108 |
| 7 | 126 |
| 8 | 144 |
| 9 | 162 |
| 10 | 180 |
| 11 | 198 |
| 12 | 216 |
| 13 | 234 |
| 14 | 252 |
| 15 | 270 |
| 16 | 1 |
| 17 | 19 |
| 18 | 37 |
| 19 | 55 |
| 20 | 73 |
| 21 | 91 |
| 22 | 109 |
| 23 | 127 |
| 24 | 145 |
| 25 | 163 |
| 26 | 181 |
| 27 | 199 |
| 28 | 217 |
| 29 | 235 |
| 30 | 253 |
| 31 | 271 |
| 32 | 2 |
| 33 | 20 |
| 34 | 38 |
| 35 | 56 |
| ... | ... |
| 135 | 134 |
| 136 | 152 |
| 137 | 170 |
| 138 | 188 |
| 139 | 206 |
| 140 | 224 |
| 141 | 242 |
| 142 | 260 |
| 143 | 278 |

| WtCnt | MCO |
|---|---|
| 144 | 9 |
| 145 | 27 |
| 146 | 45 |
| 147 | 63 |
| 148 | 81 |
| 149 | 99 |
| 150 | 117 |
| 151 | 135 |
| 152 | 153 |
| 153 | 171 |
| 154 | 189 |
| 155 | 207 |
| 156 | 225 |
| 157 | 243 |
| 158 | 261 |
| 159 | 279 |
| 160 | 10 |
| 161 | 28 |
| 162 | 46 |
| 163 | 64 |
| 164 | 82 |
| 165 | 100 |
| 166 | 118 |
| 167 | 136 |
| 168 | 154 |
| 169 | 172 |
| 170 | 190 |
| 171 | 208 |
| 172 | 226 |
| 173 | 244 |
| 174 | 262 |
| 175 | 280 |
| 176 | 11 |
| 177 | 29 |
| 178 | 47 |
| 179 | 65 |
| ... | ... |
| 279 | 143 |
| 280 | 161 |
| 281 | 179 |
| 282 | 197 |
| 283 | 215 |
| 284 | 233 |
| 285 | 251 |
| 286 | 269 |
| 287 | 287 |

FIG. 22

| 15      8 | 7      5 | 4      0 |
|---|---|---|
| ANY VALUE | ENTRY NUMBER | N |

SEMICONDUCTOR MEMORY DEVICE WITH DATA BUFFERING

CROSS-REFERENCE TO RELATED APPLICATION

This application is based upon and claims the benefit of priority from Japanese Patent Application No. 2017-002767, filed Jan. 11, 2017, the entire contents of which are incorporated herein by reference.

FIELD

Embodiments described herein relate generally to a semiconductor memory device.

BACKGROUND

A semiconductor memory device having a nonvolatile semiconductor memory is desired to have both high read performance and have write performance.

DESCRIPTION OF THE DRAWINGS

FIG. 4 illustrates a configuration of an execution management table according to the first embodiment.

FIG. 6 is a sequence diagram illustrating a protocol of command queuing according to the first embodiment.

FIG. 21A illustrates a first write data disposition table according to the first embodiment.

FIG. 21B illustrates a second write data disposition table according to the first embodiment.

FIG. 21C illustrates a third write data disposition table according to the first embodiment.

FIG. 22 illustrates TPTT according to a second embodiment.

DETAILED DESCRIPTION

Figure 1:
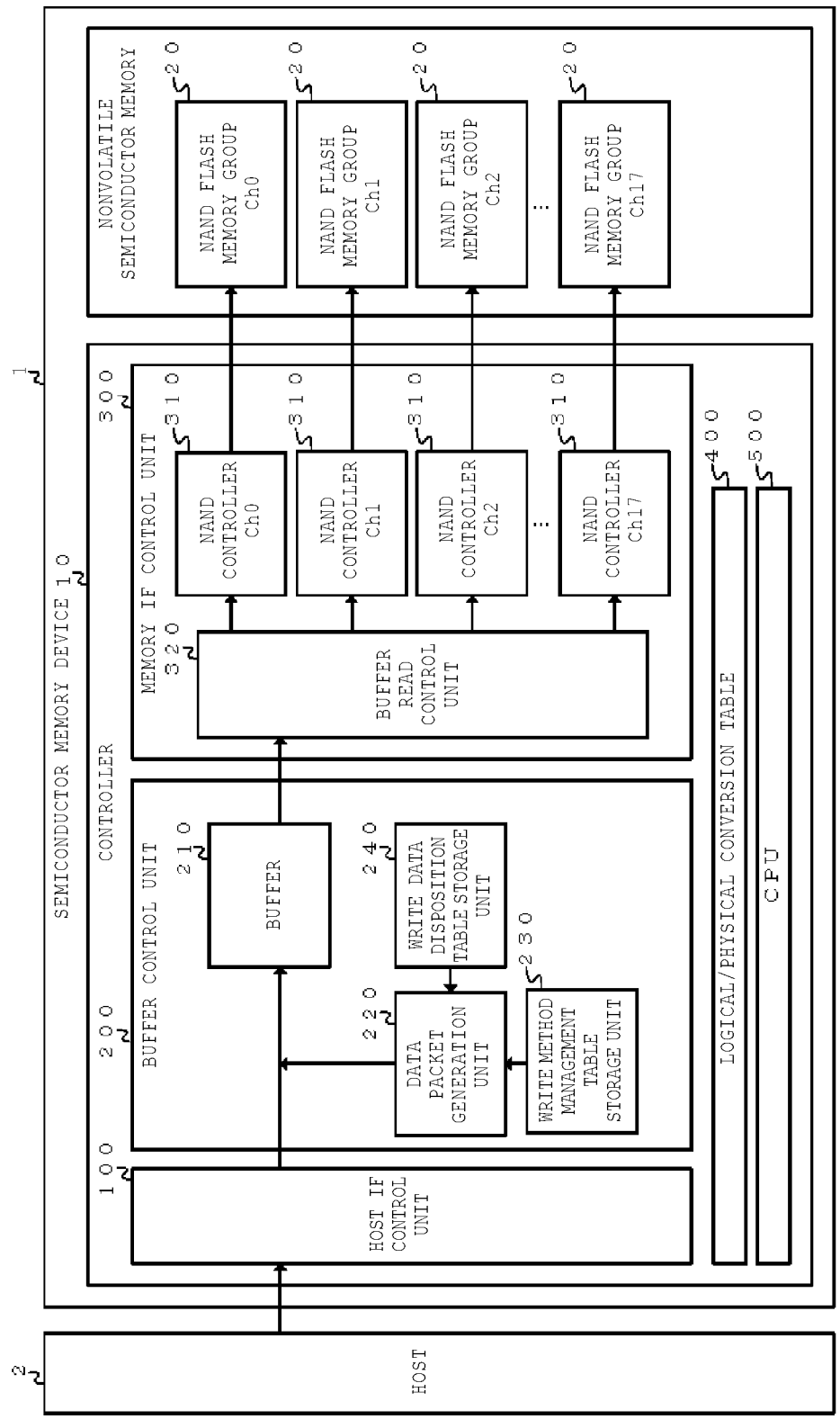
FIG. 1 is a block diagram of a semiconductor memory device according to a first embodiment.

An embodiment is directed to improving performance of a semiconductor memory device.

In general, according to an embodiment, a semiconductor storage device comprises at least two nonvolatile semiconductor memories, a buffer in which data received from a host and to be written to the nonvolatile semiconductor memories in response to a write command received from the host can be temporarily stored, and a controller connected to the nonvolatile semiconductor memories and configured to transfer data stored in the buffer to a number N of the nonvolatile semiconductor memories in parallel. The number N is set according to a reception of data from the host, and N is greater than or equal to 1 and less than or equal to m, which is the number of nonvolatile semiconductor memories connected to the controller.

Hereinafter, a semiconductor memory device according to an example embodiment will be described with reference to the drawings. In the following description, the same symbols or reference numerals will be attached to the elements having the same function or the same configuration.

First Embodiment

FIG. 1 is a block diagram of a semiconductor memory device according to a first embodiment.

The semiconductor memory device 1 includes a controller 10 and a nonvolatile semiconductor memory 20. In the following description, description on a functional block necessary for reading data from the nonvolatile semiconductor memory 20 will be omitted.

The controller 10 communicates with a host 2 and controls an entire operation of the semiconductor memory device 1. The controller 10 is a semiconductor integrated circuit which is configured as, for example, a system on a chip (SoC).

In the description of the present embodiment, the host 2 is a computer which supports a serial attached SCSI (SAS) standard interface, but may be a computer which supports other standard interfaces, such as a serial ATA (SATA) standard interface or NVM express (NVMe®) standard interface. The semiconductor memory device 1 may be configured to be able to communicate with a plurality of hosts 2.

The nonvolatile semiconductor memory 20 stores data in a nonvolatile manner. The nonvolatile semiconductor memory 20 according to the present embodiment is a NAND flash memory, but any other device can be used for the nonvolatile semiconductor memory 20. For example, a three-dimensional structure flash memory, a NOR type flash memory, a magnetoresistive random access memory (MRAM), or the like can be employed. In the following description, the nonvolatile semiconductor memory 20 is referred to as a NAND flash memory 20.

The semiconductor memory device 1 according to the present embodiment includes the NAND flash memories 20 of 18 channels (Ch). The controller 10 can control in parallel the NAND flash memories 20 connected to the channels. That is, the controller 10 can transfer data substantially at the same time to the NAND flash memories 20 connected to the channels. One channel may be connected to a plurality of the NAND flash memories 20. Hereinafter, the NAND flash memories 20 connected to the channels are referred to as a NAND flash memory group Ch0 to Ch17. The number of channels may be greater than 18 or may be smaller than 18.

The controller 10 includes a host interface (IF) control unit 100, a buffer control unit 200, a memory interface (IF) control unit 300, a logical-physical conversion table 400, and a central processing unit (CPU) 500.

A detailed configuration of the host IF control unit 100 will be described later.

The buffer control unit 200 includes a buffer 210, a data packet generation unit 220, a write method management table storage unit 230, and a write data disposition table storage unit 240.

The buffer 210 temporarily stores data received from the host 2. The buffer 210 according to the present embodiment is a static random access memory (SRAM), but may employ other types of memories such as a dynamic random access memory (DRAM).

The data packet generation unit 220 changes data stored in the buffer 210 into a form of a data packet. The write method management table storage unit 230 stores setting of a method by which the controller 10 writes data to the NAND flash memory 20. The write data disposition table storage unit 240 stores disposition table of data written to the NAND flash memory 20. Detailed description will be described later.

The memory IF control unit 300 includes a NAND controller 310 and a buffer read control unit 320.

The NAND controller 310 is connected to each of the NAND flash memory group Ch0 to Ch17. The NAND controller 310 controls operations of writing, reading, erasing, and the like of data to, from, and in the NAND flash memory 20. Hereinafter, the NAND controller 310 may be referred to as the NAND controllers Ch0 to Ch17.

The buffer read control unit 320 transfers a data packet read from the buffer 210 to each NAND controller 310.

The logical-physical conversion table 400 performs conversion between a logical address which is designated by a command received from the host 2 and a physical address of the NAND flash memory 20.

Figure 2:
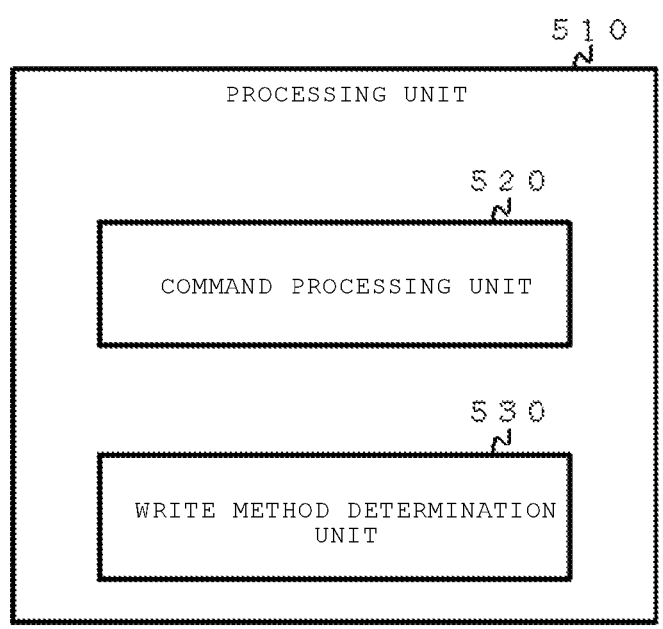
FIG. 2 illustrates functional units which are achieved by executing firmware according to the first embodiment.

The CPU 500 performs entire control of the semiconductor memory device 1 on the basis of firmware (FW). FIG. 2 illustrates various functional units which are obtained by the CPU 500 executing the FW. The CPU 500 functions as a processing unit 510 which controls the entire semiconductor memory device 1. The processing unit 510 includes a command processing unit 520 and a write method determination unit 530.

The buffer 210 and the CPU 500 may be configured as another semiconductor integrated circuit without being embedded in the controller 10. In addition, in the following description, a part or all of the functions which are to be performed by executing the FW can also be performed by dedicated hardware (HW), and a part or all of the functions which are to be performed by HW can also be performed by executing the FW.

Next, a configuration of the host IF control unit 100 will be described with reference to FIG. 3.

The host IF control unit 100 includes a communication interface (IF) unit 110, a link control unit 120, a reception control unit 130, an execution control unit 150, and a transmission control unit 170.

The communication IF unit 110 controls a physical layer in communication with the host 2. The link control unit 120 performs control of a link layer, such as management of connection with the host 2 or primitive transmission and reception. The reception control unit 130 controls reception of information from the host 2. The execution control unit 150 controls execution of a command received from the host 2. The transmission control unit 170 controls transmission of information to the host 2.

The reception control unit 130 includes a reception frame FIFO 131, a reception information selection unit 132, a command table 133, and a reception counter 134. The reception frame FIFO 131 temporarily stores a frame 190 that has been received from the host 2. The reception information selection unit 132 takes the frame 190 from the reception frame FIFO 131, and selects a storage destination on the basis of a frame type field of a frame header. More specifically, the reception information selection unit 132 stores a COMMAND frame 191, which is command information, in the command table 133. The reception information selection unit 132 transfers a DATA frame 192, which is data to be stored in the nonvolatile semiconductor memory 20, to the buffer control unit 200.

The COMMAND frame 191 stored in the command table 133 is retrieved by the command processing unit 520. The command processing unit 520 interprets the command type (that is, one of a write command, a read command, and a non-data command), the logical block address (LBA), the amount of transfers, and the like.

The reception counter 134 counts a length of the DATA frame 192 (corresponding to the quantity of data) that is transferred to the buffer control unit 200. A value from the reception counter 134 is output to the execution control unit 150.

Detailed description of the execution control unit 150 will be described below.

The transmission control unit 170 includes a transmission frame FIFO 171, a transmission information selection unit 172, and a transmission counter 173.

The transmission frame FIFO 171 is a FIFO for temporarily storing a frame 193 which is to be transmitted to the host 2. The transmission information selection unit 172 selects, based on an instruction of the execution control unit 150, a status frame 194 and a DATA frame 195, and stores the selected frames in the transmission frame FIFO 171.

The status frame 194 indicates an internal state of the semiconductor memory device 1. The status frame 194 includes a RESPONSE frame and a XFER_RDY (Transfer Ready) frame. The RESPONSE frame notifies the host 2 that execution of a command has been completed. The XFER_RDY frame notifies the host 2 that transfer of write data is allowed.

The DATA frame 195 is data read from the nonvolatile semiconductor memory 20 and stored in the buffer 210. The transmission counter 173 counts a length of the DATA frame 195 being transferred from the buffer control unit 200. A value from the transmission counter 173 is output to the execution control unit 150.

The execution control unit 150 includes a protocol engine 151, an execution management table 152, a reception completion determination unit 153, and a transmission completion determination unit 154.

The protocol engine 151 executes a command in accordance with a protocol that is proper for the communication interface with the host 2.

The execution management table 152 is for queuing and executing commands. An example of a configuration of the execution management table 152 is illustrated in FIG. 4. The execution management table 152 is configured with, for example, eight double words (DW0 to DW7, each DW is 32 bits). The number of management tables is determined in accordance with the number of commands which are queued and executed. For example, in a case where eight commands are queued and executed, eight tables, each being configured with eight DWs, are established.

The execution management table 152 includes fields for an initiator port transfer tag (IPTT) 155, a command type 156, an LBA 157, a total amount of transfers 158, a scheduled amount of transmissions/receptions 159, and flags 160 to 163

The IPTT 155 is a tag with 16 bits and is attached to a frame header by the host 2 so as to identify each command that is being queued and executed. The command type 156 and the LBA 157 are information based on the COMMAND frame 191 stored in the command table 133. The total amount of transfers 158 is the amount of transferred data (e.g., data length or data quantity) which is designated by the command. The scheduled amount of transmissions/receptions 159 is the scheduled amount of transmissions/receptions of data which is to be transmitted to and received. The scheduled amount of transmissions/receptions 159 is a scheduled amount of transmissions when a read command is executed. The scheduled amount of transmissions/receptions 159 is a scheduled amount of receptions when a write command is executed. The scheduled amount of transmissions/receptions 159 may coincide with the total amount of transfers 158 which is designated by the command. The scheduled amount of transmissions may be an amount of data stored in the buffer 210. The scheduled amount of receptions may be based on an empty space of the buffer 210. The flags 160 to 163 store information that each module of the controller 10 refers to in executing a command.

Figure 3:
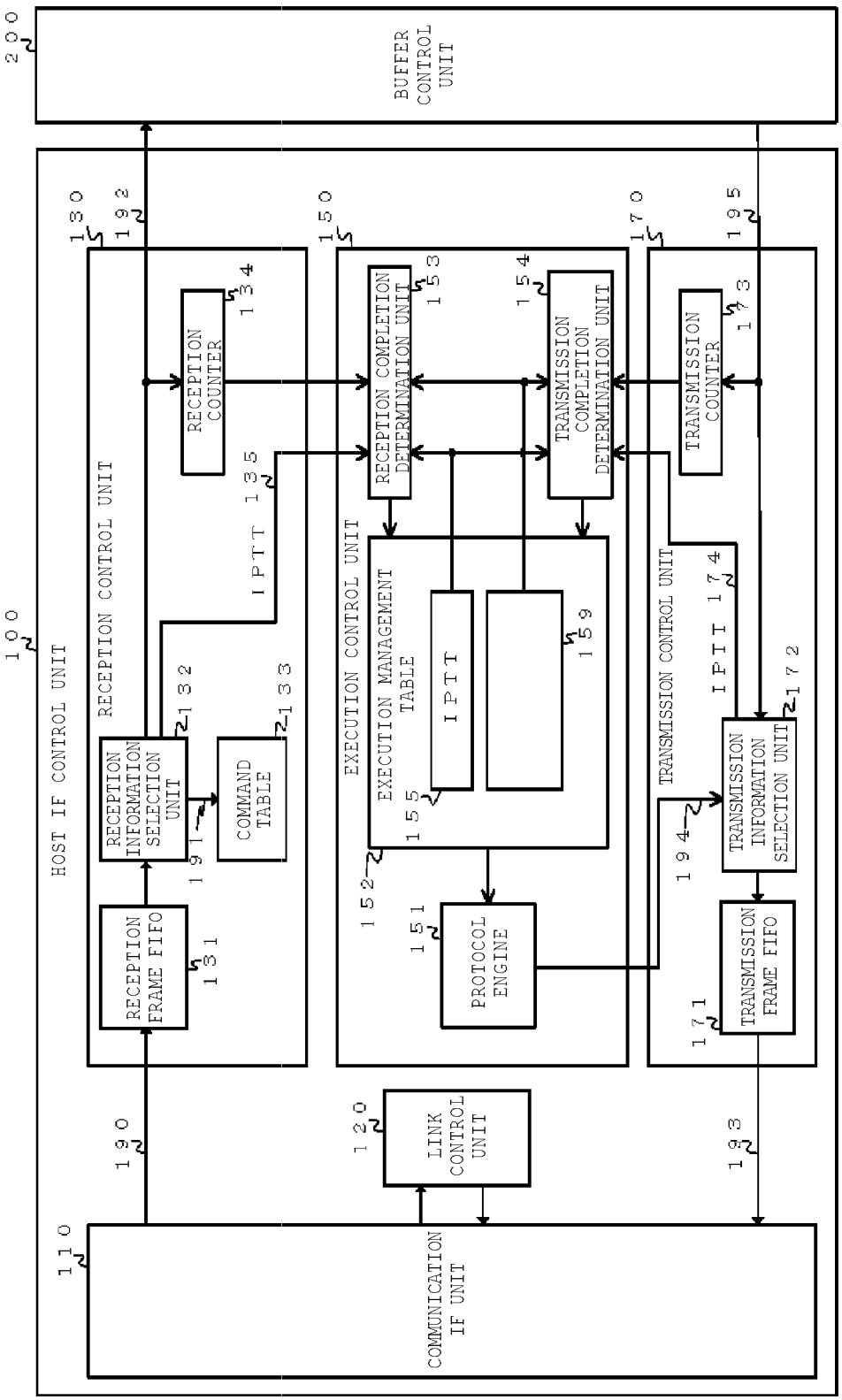
FIG. 3 is a block diagram of a host interface control unit according to the first embodiment.

Description will be continued with reference to FIG. 3. IPTT 135 of a currently received DATA frame 192 and a value from the reception counter 134 are input to the reception completion determination unit 153 from the reception control unit 130. In addition, IPTT 155 and a scheduled amount from transmissions/receptions 159 are input to the reception completion determination unit 153 from each table of the execution management table 152. If IPTT 135 coincides with IPTT 155 and the scheduled amount from transmissions/receptions 159 coincides with the value form the reception counter 134, the reception completion determination unit 153 notifies the execution management table 152 that write data reception has been completed.

IPTT 174 of a DATA frame 195 which is being transmitted and a value from a transmission counter 173 are input to the transmission completion determination unit 154 from the transmission control unit 170. In addition, the IPTT 155 and the scheduled amount of transmissions/receptions 159 are input to the transmission completion determination unit 154 from each table of the execution management table 152. If IPTT 174 coincides with IPTT 155 and the scheduled amount of transmissions/receptions 159 coincides with a value from the transmission counter 173, the transmission completion determination unit 154 notifies the execution management table 152 that transmission of read data has been completed.

Figure 5:
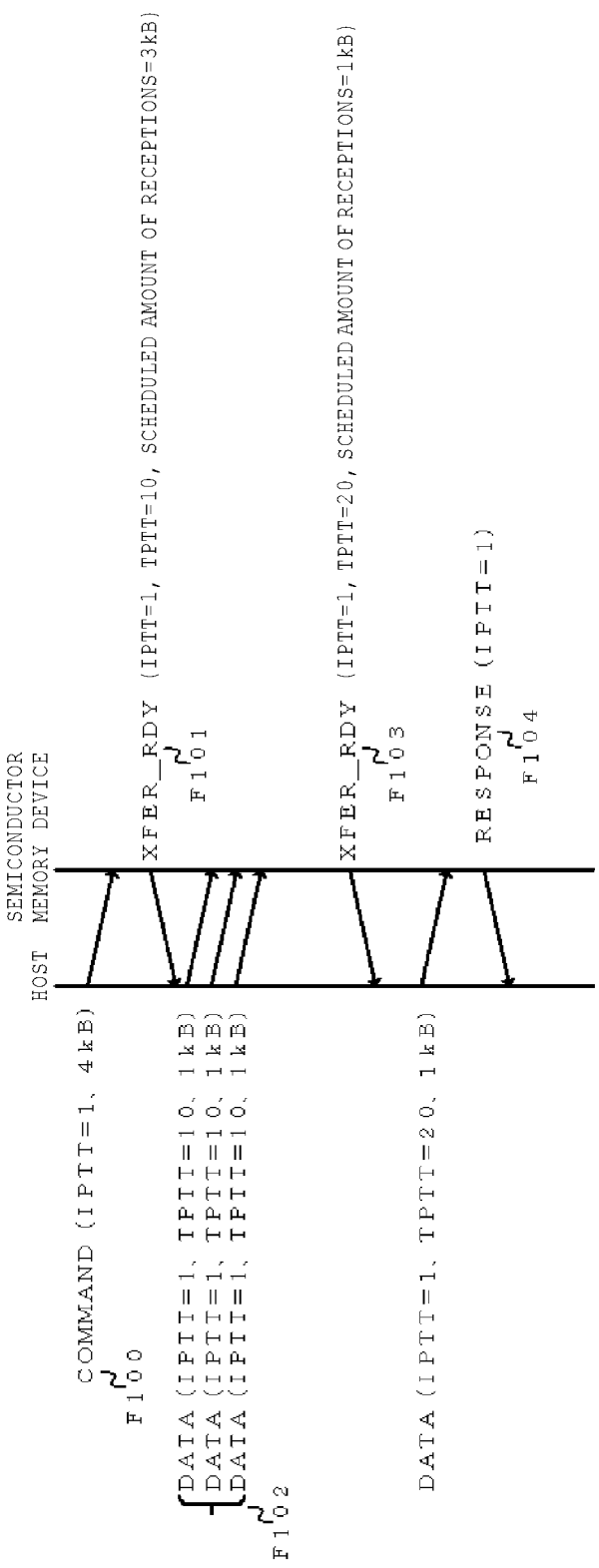
FIG. 5 is a sequence diagram illustrating a protocol of write commands according to the first embodiment.

Next, a protocol of a write command will be described with reference to FIG. 5. In order to simplify the description, particulars of the control of the link layer, which is performed by the link control unit 120, are omitted.

The host 2 transmits a COMMAND frame so as to issue a write command (F100). Here, it is assumed that an IPTT is "1" and 4 kB of data is to be processed in association with the command. The COMMAND frame is stored in the command table 133. The command processing unit 520 retrieves the COMMAND frame and interprets the content thereof. The command processing unit 520 allocates available space of the buffer 210 and other necessary processing.

The command processing unit 520 sets IPTT 155, a write command as the command type 156, the LBA 157, the total amount of transfers 158, and the scheduled amount of receptions as the scheduled amount of transmissions/receptions 159 in the execution management table 152. In addition, a target port transfer tag (TPTT) is set in a flag 160. The TPTT is a tag with 16 bits for identifying data. Any other value may be used for the value of the TPTT. Here, it is assumed that the scheduled amount of receptions is 3 kB and the TPTT is 10.

The execution management table 152 requests the protocol engine 151 to generate a XFER_RDY frame. The protocol engine 151 acquires the values from the fields in the execution management table 152 including values for IPTT 155, the scheduled amount of receptions, the TPTT set in the flag 160. The protocol engine 151 generates the XFER_RDY frame on the basis of such information. The transmission information selection unit 172 stores the XFER_RDY frame in the transmission frame FIFO 171. The stored XFER_RDY frame is transmitted to the host 2 via the communication IF unit 110 (F101).

The host 2, which receives the XFER_RDY frame, then transmits the DATA frames (F102). The host 2 transmits DATA frames of a number corresponding to the scheduled amount of receptions notified by the XFER_RDY frame. The host 2 adds the TPTT supplied with the XFER_RDY frame to the DATA frames and then transmits the DATA frames.

The reception control unit 130 transfers the received DATA frames to the buffer control unit 200. If a value of the scheduled amount of transmissions/receptions 159 coincides with a value of the reception counter 134, the reception completion determination unit 153 notifies the execution management table 152 of reception completion for the write data.

When reception of DATA frames with the total amount of transfers designated by the command has not been completed, the execution management table 152 interrupts the CPU 500. The command processing unit 520 then sets the scheduled amount of receptions, the TPTT, and the like again. Here, it is assumed that the scheduled amount of receptions is 1 kB and the TPTT is 20. The execution management table 152 requests the protocol engine 151 to generate the XFER_RDY frame again, and the XFER_RDY frame is retransmitted (F103).

Meanwhile, when reception of the DATA frames with the total amount of transfers designated by the command is completed, the execution management table 152 requests the protocol engine 151 to generate a RESPONSE frame. The protocol engine 151 acquires the value for IPTT 155 from the execution management table 152 and generates the RESPONSE frame. The transmission information selection unit 172 stores the RESPONSE frame in the transmission frame FIFO 171. The stored RESPONSE frame is then transmitted to the host 2 via the communication IF unit 110

(F104). The host 2 recognizes the execution of the write command has been completed when the RESPONSE frame has been received.

Next, a protocol in a case where a write command is queued and executed will be described with reference to FIG. 6.

The host 2 transmits three COMMAND frames of IPTT=1, 2, and 3 so as to issue three write commands (F200). It is assumed that the amount of transfers for each of these three write commands is 4 kB.

As described with reference to FIG. 6, the semiconductor memory device 1 transmits XFER_RDY frames (F201). Here, it is assumed that three XFER_RDY frames one with IPTT=2 and TPTT=10, one with IPTT=1 and TPTT=20, and one with IPTT=3 and TPTT=30 are transmitted. In addition, it is assumed that the scheduled amount of receptions is 4 kB for each of the three XFER_RDY frames.

The host 2 transmits DATA frames (F202) after the XFER_RDY frame(s) have been received. The host 2 then transmits a DATA frame having a number corresponding to the scheduled amount of receptions as notified with the XFER_RDY frame. The host 2 adds the TPTT notified by the XFER_RDY frame to the DATA frame and transmits the TPTT. The host 2 may transmit the DATA frame in any order.

As described with reference to FIG. 5, if reception of the DATA frame of the total amount of transfers designated by the command is completed, the semiconductor memory device 1 transmits a RESPONSE frame (F203). The host 2 recognizes completion of the write command by receiving the RESPONSE frame.

The protocol of the write command between the semiconductor memory device 1 and the host 2 has been described. The following describes how the semiconductor memory device 1 writes the data, which is received with the write command, to the nonvolatile semiconductor memory 20.

Figure 7A:
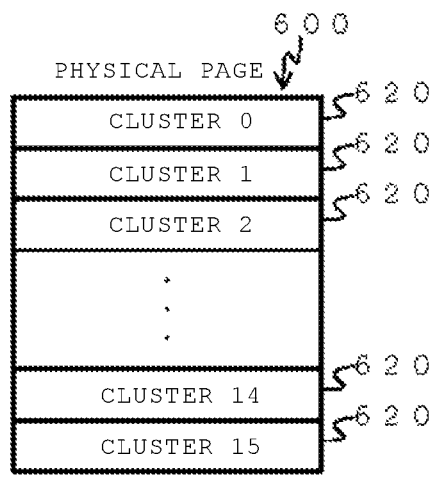
FIGS. 7A and 7B respectively illustrate a physical page and a physical block according to the first embodiment.
Figure 7B:
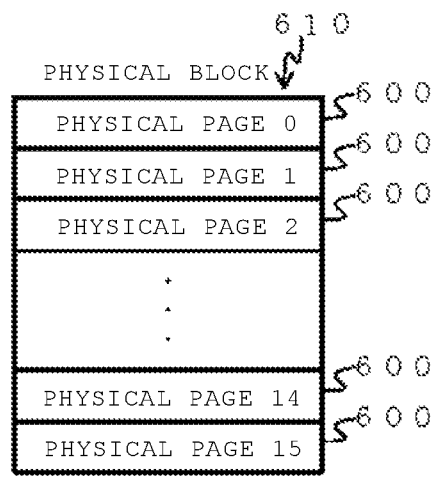

FIGS. 7A and 7B respectively illustrate a configuration of a physical page 600 and a configuration of a physical block 610 of the NAND flash memory 20 according to the present embodiment.

As depicted in FIG. 7A, a minimum management unit for reading data from or writing data to the NAND flash memory 20 is a cluster 620. In the present embodiment, the size of each cluster 620 is 4 kB. The minimum circuit configuration unit by which data can be read from or written to the NAND flash memory 20 is referred to as a physical page 600. In the present embodiment, the size of the physical pages 600 is 16 clusters (4 kB×16 cluster=64 kB).

In addition, as depicted in FIG. 7B, a minimum circuit configuration unit by which data in the NAND flash memory 20 can be erased is a physical block 610. In the present embodiment, the size of a physical block 610 is 16 physical pages (64 kB×16 physical pages=1024 kB). The unit sizes given above for clusters, physical pages, and physical blocks are examples, and the present embodiment is not limited thereto.

Figure 8:
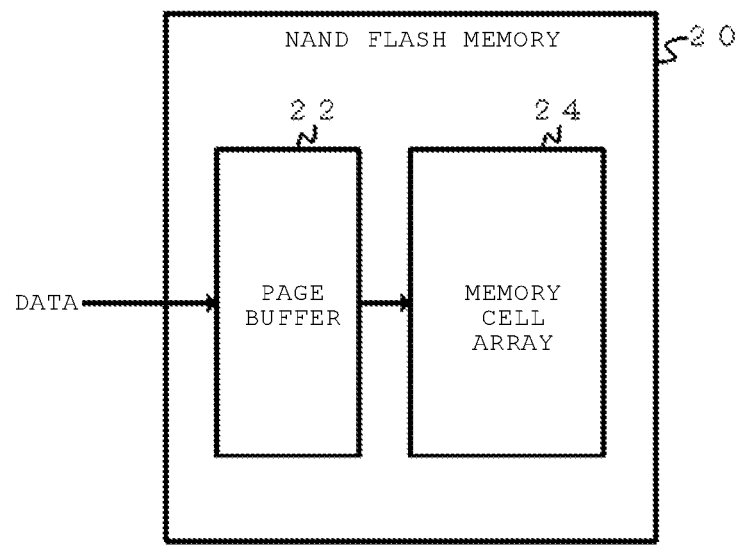
FIG. 8 illustrates a configuration of NAND flash memory according to the first embodiment.

Next, a configuration of the NAND flash memory 20 will be described with reference to FIG. 8.

The NAND flash memory 20 includes a page buffer 22 and a memory cell array 24. The page buffer 22 temporarily stores data. The memory cell array 24 stores data in a nonvolatile manner.

In the present embodiment, the size or data capacity of the page buffer 22 is the same as the size or data capacity of one physical page. That is, the size of the page buffer 22 is 16 clusters (64 kB). Data stored in the page buffer 22 can be written to the memory cell array 24 all at once. In order to improve write performance, it is preferable that writing to the memory cell array 24 is performed after the entire page buffer 22 is filled with data to be written.

Next, a configuration of a logical page 630 that is a unit by which the controller 10 writes data to the NAND flash memory 20 will be described with reference to FIG. 9.

Figures 9, 10:
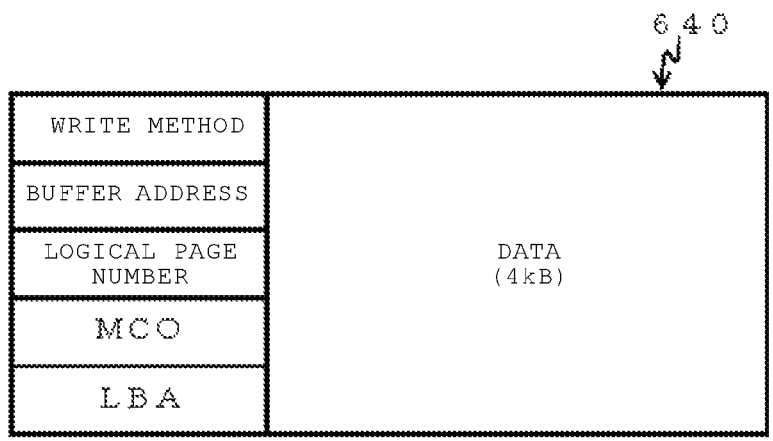
FIG. 9 illustrates a logical page according to the first embodiment.
FIG. 10 illustrates a data packet according to the first embodiment.

One cell of FIG. 9 corresponds to one cluster 620. A number, which is referred to as Media Cluster Offset (MCO), is assigned to each cluster. Positions for each cluster in the logical page 630 are specified by the assigned MCO numbers.

In addition, one row (16 clusters) in a horizontal direction corresponding to each NAND flash memory 20 corresponds to the physical page 600. That is, a size of the logical page 630 is 18 physical pages in the present embodiment.

Next, a configuration of a data packet 640 according to the present embodiment will be described with reference to FIG. 10.

The data packet generation unit 220 generates the data packet 640 by adding a header to each cluster of the data received from the host IF control unit 100. The generated data packet 640 is stored in the buffer 210.

Information for controlling by the memory IF control unit 300 is stored in the header.

A logical block address (LBA) is a logical address of a sector unit (for example, 512 Bytes) which is managed by the host 2. The "LBA" portion of the data packet 640 indicates a logical address for the first sector of the data stored within the data packet 640.

The "logical page number" and the "MCO" portions of the data packet 640 together indicate to which cluster of which NAND flash memory 20 the data stored in the data packet 640 is to be written. The "buffer address" portion of data packet 640 indicates the position at which the data packet 640 is to be stored within the buffer 210. A "write method" portion of data packet 640 indicates which one of the possible write methods (which will be described below) is to be used to write the "DATA" of the data packet 640 to the nonvolatile semiconductor memory.

Next, a first method by which the controller 10 writes data to the NAND flash memory 20 will be described with reference to FIG. 11.

According to the first method, the controller 10 places data received from the host 2 in the sequential order of the MCOs in each logical page for each cluster. That is, the data that is first received is disposed in MCO=0, data that is second received is disposed in MCO=1, and data that is received next to that is disposed in MCO=2. And so on until the data that is received after MCO=17 is disposed in MCO=18. Hereinafter, the first method is referred to as a vertical write.

Figures 11, 12:
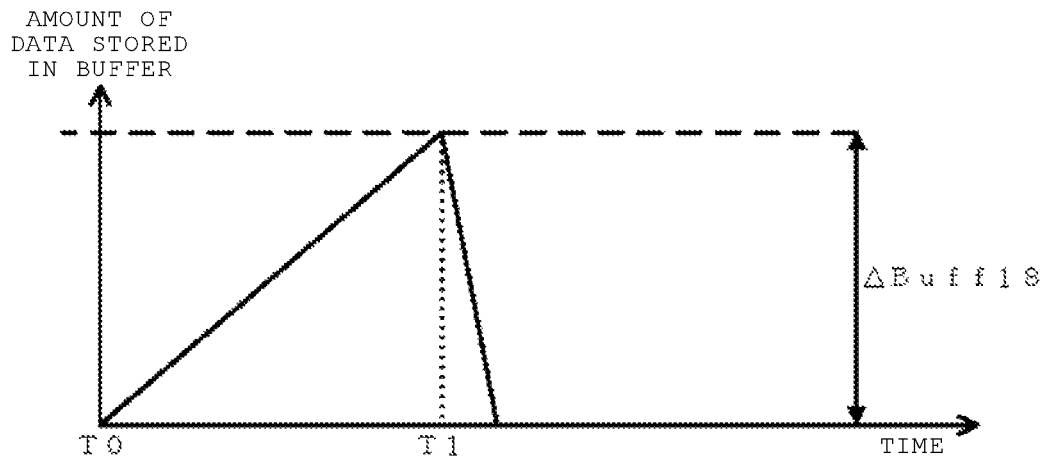
FIG. 11 illustrates a first write method according to the first embodiment.
FIG. 12 illustrates a change of the amount of data stored in a buffer when the first write method according to the first embodiment is used.

FIG. 12 illustrates changes in the amount of data stored in the buffer 210 during a writing of one logical page of data by the controller 10 to the NAND flash memory 20 by using the vertical write.

The data packet generation unit 220 stores a data packet of MCO=0 of a certain logical page in the buffer 210 at time T0. Thereafter, the data packet generation unit 220 sequentially stores a data packet of MCO=1, a data packet of MCO=2, and so in the buffer 210. After data packets of MCO=1 to MCO=269 have all been stored in the buffer 210, the data packet generation unit 220 stores a data packet of MCO=270 in the buffer 210 at time T1.

When the data packet of MCO=270 is stored in the buffer 210, data of the amount of one physical page of a NAND flash memory in the NAND flash memory group Ch0 has been stored in the buffer 210. The buffer read control unit 320 transfers the data from the buffer 210 to the NAND flash memory group Ch0.

Thereafter, when a data packet of MCO=271 is stored in 210 in the same manner, data is transferred from the buffer 210 to the NAND flash memory group Ch1. Next, when a data packet of MCO=272 is stored in the buffer 210, data is transferred from the buffer 210 to the NAND flash memory group Ch2. Hereinafter, storage and transfer of the data will be continued below in the same manner.

At this time, a maximum amount (ΔBuff18) of the data which should be stored in the buffer 210 is the amount of 271 data packets (e.g., MCO=0 to MCO=270).

In a case where the LBA of the data received by the host 2 is sequential, if the data is written to the NAND flash memory 20 by using the vertical write, it is possible to improve sequential read performance because the controller 10 can read data from each NAND flash memory 20 of each channel in parallel.

Next, a second method by which the controller 10 writes data to the NAND flash memory 20 will be described with reference to FIG. 13.

According to the second method, the controller 10 disposes the data received from the host 2 nine channels in the sequential MCO order. That is, data which is first received within each logical page is disposed in MCO=0, data which is second received is disposed in MCO=1, and data which is received next to that is disposed in MCO=2. And so on until data which is received after MCO=8 is disposed in MCO=18 (on Ch0 row in FIG. 13). Data which is received after MCO=278 is disposed in MCO=9 (on Ch9 row in FIG. 13).

Here, the method of writing data to the nine channels in the sequence of MCO has been described, but it is also possible to write data to a predetermined N channels in the sequence of MCO (N is a natural number greater than 1 and less than 18). In the following, the second method of writing data to each N-channel in the sequence of MCO is referred to as an N-channel return write. The aforementioned vertical write corresponds to an 18-channel return write.

In a case where an LBA of data received from the host 2 is sequential, by writing data to the NAND flash memory 20 according to the N-channel return write, it is possible to improve the sequential read performance in a range of N channels.

Figure 14:
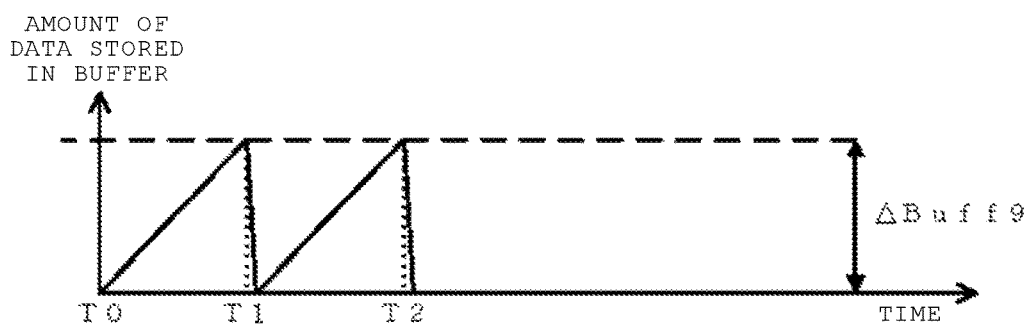
FIG. 14 illustrates a change of the amount of data stored in the buffer when the second write method according to the first embodiment is used.

FIG. 14 illustrates a change of the amount of data stored in the buffer 210 in a case where the controller 10 according to the present embodiment writes data amounting to one logical page to the NAND flash memory 20 by the nine-channel return write.

The data packet generation unit 220 stores a data packet of MCO=0 of a certain logical page in the buffer 210 at time T0. Thereafter, the data packet generation unit 220 sequentially stores the data packet of MCO=1, the data packet of MCO=2, . . . in the buffer 210. In addition, after storing the data packet of MCO=8 in the buffer 210, the data packet generation unit 220 stores the data packet of MCO=18 in the buffer 210. Furthermore, after storing the data packets of MCO=1 to MCO=260 in the buffer 210, the data packet generation unit 220 stores the data packet of MCO=270 in the buffer 210 at time T1.

When the data packet of MCO=270 is stored in the buffer 210, data stored in the buffer 210 amount to one physical page of a NAND flash memory in the NAND flash memory group Ch0. The buffer read control unit 320 transfers the data from the buffer 210 to the NAND flash memory group Ch0.

Thereafter, when a data packet of MCO=271 is stored in the buffer 210 in the same manner, data are transferred from the buffer 210 to the NAND flash memory group Ch1. Next, when a data packet of MCO=272 is stored in the buffer 210, data are transferred from the buffer 210 to the NAND flash memory group Ch2. Hereinafter, storage and transfer of the data will be continued in the same manner.

In the same manner, after storing data packets of MCO=9, 10, . . . , 17, 27, 28, . . . , 268, and 269 in the buffer 210, the data packet generation unit 220 stores a data packet of MCO=279 in the buffer 210 at time T2.

When the data packet of MCO=279 is stored in the buffer 210, data stored in the buffer 210 amount to one physical page of a NAND flash memory in the NAND flash memory group Ch9. The buffer read control unit 320 transfers the data from the buffer 210 to the NAND flash memory group Ch9.

Thereafter, when a data packet of MCO=280 is stored in the buffer 210, data is transferred from the buffer 210 to the NAND flash memory group Ch10, in the same manner. Next, when a data packet of MCO=281 is stored in the buffer 210, data is transferred from the buffer 210 to the NAND flash memory group Ch11. Hereinafter, storage and transfer of the data will be continued in the same manner.

Figure 13:
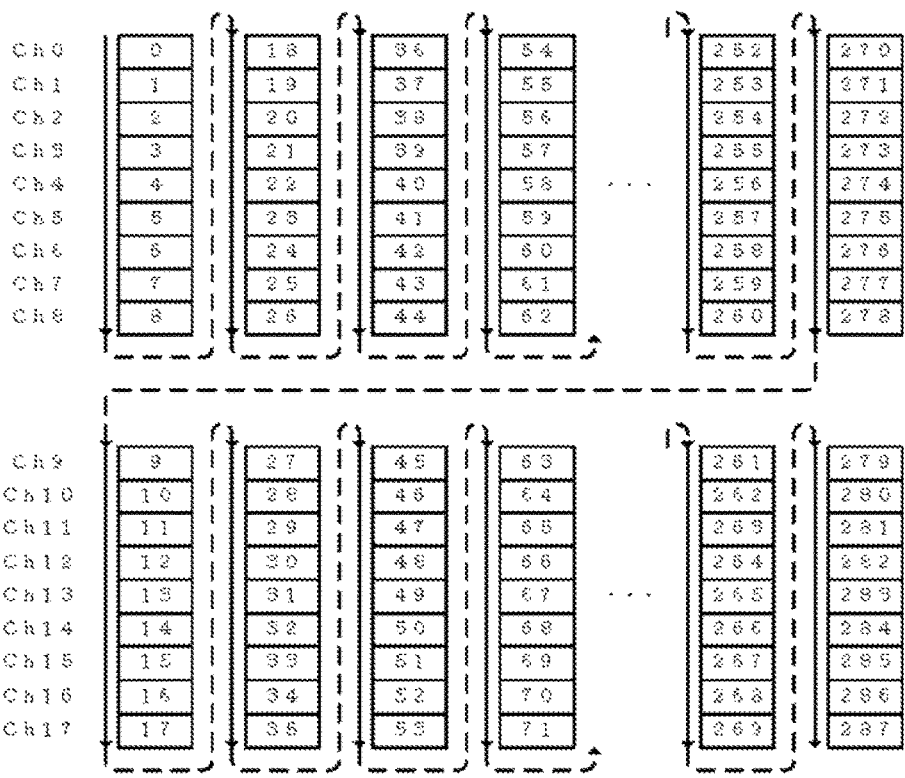
FIG. 13 illustrates a second write method according to the first embodiment.

At this time (T1 in FIG. 14), a maximum amount (ΔBuff9) of the data which should be stored in the buffer 210 is 136 data packets in MCO=0, 1, . . . , 8, 18, 19, . . . , 259, 260, and 270 of Ch0 to Ch8 as depicted in FIG. 13. In addition, time T1, when data transfer to the NAND flash memory group Ch0 starts, occurs earlier in this 9-channel return write process than the vertical write process.

Figure 15:
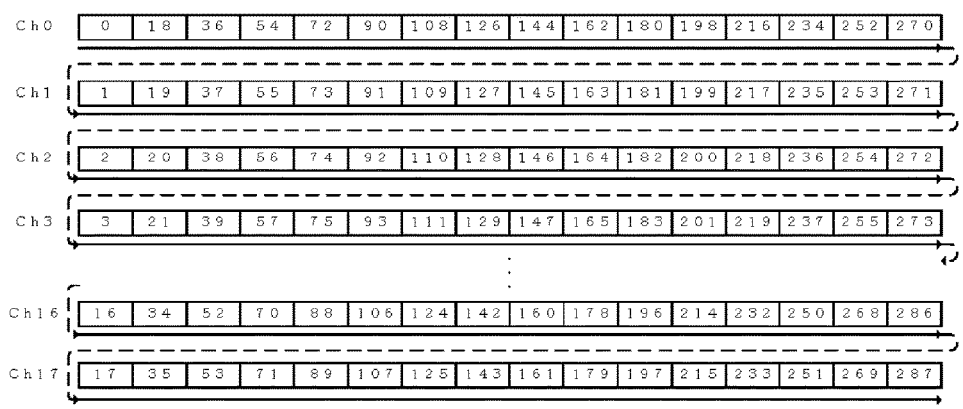
FIG. 15 illustrates a third write method according to the first embodiment.

Next, a third method by which the controller 10 writes data to the NAND flash memory 20 will be described with reference to FIG. 15.

According to the third method, the controller 10 disposes the data received from the host 2 in each channel of the NAND flash memory 20. That is, data which is first received within each logical page is disposed in MCO=0, data which is second received is disposed in MCO=18, and data which is received next to that is disposed in MCO=36. Data which is received after MCO=270 is disposed in MCO=1. Hereinafter, the third method is referred to as a horizontal write. The horizontal write corresponds to a one-channel return write.

Figure 16:
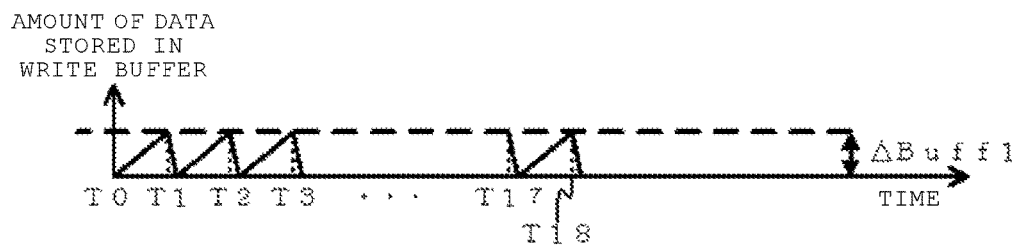
FIG. 16 illustrates a change of the amount of data stored in the buffer when the third write method according to the first embodiment is used.

FIG. 16 illustrates a change of the amount of data stored in the buffer 210 in a case where the controller 10 writes data of one logical page to the NAND flash memory 20 by using the horizontal write.

The data packet generation unit 220 stores the data packet of MCO=0 of a certain logical page in the buffer 210 at time T0. Thereafter, the data packet generation unit 220 sequentially stores the data packet of MCO=18, the data packet of MCO=36, and so on in the buffer 210. In addition, after storing the data packets of MCO=18 to MCO=252 in the buffer 210, the data packet generation unit 220 stores the data packet of MCO=270 in the buffer 210 at time T1.

When the data packet of MCO=270 is stored in the buffer 210, data of the amount of one physical page of a NAND flash memory in the NAND flash memory group Ch0 is stored in the buffer 210. The buffer read control unit 320 transfers the data from the buffer 210 to the NAND flash memory group Ch0.

Thereafter, if data packets of MCO=1, 19, 37, . . . , 253, and 271 are stored in the buffer 210 in the same manner, data is transferred from the buffer 210 to the NAND flash memory group Ch1 at time T2. In addition, if data packets of MCO=2, 20, 38, . . . , 254, and 272 are stored in the buffer 210, data is transferred from the buffer 210 to the NAND flash memory group Ch2 at time T3. Hereinafter, storage and transfer of the data will be continued in the same manner.

At this time, a maximum amount (ΔBuff1) of the data which should be stored in the buffer 210 is the 15 data packets of MCO=0, 18, 36, . . . , 252. In addition, here the time T1, when data transfer to the NAND flash memory group Ch0 starts, is earlier than start time of the vertical write or 9-channel return write. That is, the horizontal write can improve write performance.

As described above, in the N-channel return write (1≤N≤18), a larger N value provides a higher sequential read performance. However, the larger N is, the more data which must be stored in the buffer 210 before transfer from the buffer 210 begins, and thus, write performance may decrease due to this factor.

Each of the aforementioned write methods may be determined for one semiconductor memory device 1, may be changed for each logical page 630, and may be changed for each write command.

An overview of the method(s) by which the controller 10 writes data to the NAND flash memory 20 was provided above. In the following, how the write method is performed will be described.

As described above, the command processing unit 520 sets the execution management table 152 for executing a write command. At this time, the write method determination unit 530 determines the write method according to the scheduled amount of receptions. The write method determination unit 530 sets the determined write method in a write method management table 650 in the write method management table storage unit 230.

Figure 17:
FIG. 17 illustrating a configuration of a write method management table according to the first embodiment.

As depicted in FIG. 17, the write method management table 650 includes values for an IPTT, a TPTT, and a write method in each entry. In the example illustrated in FIG. 17, data with IPTT=1 and TPTT=10 is written to the NAND flash memory 20 by using the vertical write. Data with IPTT=2 and TPTT=20 is written to the NAND flash memory 20 by using the horizontal write. Data with IPTT=3 and TPTT=30 is written to the NAND flash memory 20 by using the 9-channel return write. Data with IPTT=4 and TPTT=40 is written to the NAND flash memory 20 by using the vertical write.

The number of entries of the write method management table 650 depends on the number of write commands which are queued and executed. In FIG. 17, the write method management table 650 includes eight entries (rows as depicted in FIG. 17), and can thus queue eight write commands for execution.

Figure 18:
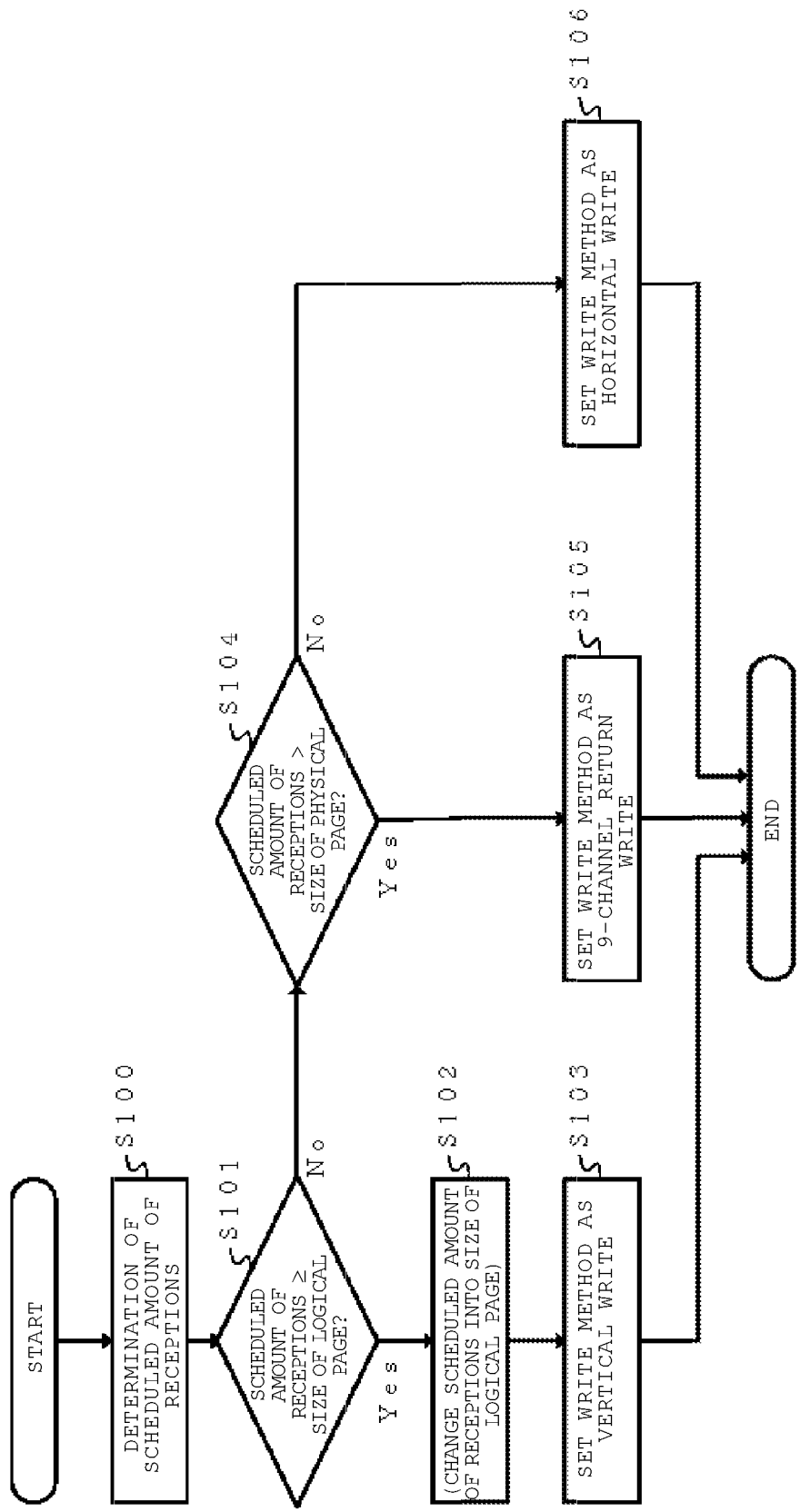
FIG. 18 is a flow diagram illustrating a determination sequence of a write method according to the first embodiment.

Next, an example of a determination sequence of the write method, which is performed by the write method determination unit 530, will be described with reference to FIG. 18.

The command processing unit 520 determines the scheduled amount of receptions (S100). This may be determined on the basis of empty space in the buffer 210, as described above. When the scheduled amount of receptions corresponds to larger than or equal to a size of the logical page 630 (S101: Yes), the command processing unit 520 translates the scheduled amount of receptions into the unit size of a logical page 630 (S102). This is to limit the maximum amount of data stored in the buffer 210 per command up to ΔBuff18. S102 may be skipped. At this time, the write method determination unit 530 sets a write method as the vertical write (S103). This is because sequential data of a long size (e.g., greater than one logical page of data) will be received.

When the scheduled amount of receptions corresponds to less than a size of the logical page 630 (S101: No) but corresponds to larger than a size of the physical page 600 (S104: Yes), the write method determination unit 530 sets a write method as the 9-channel return write (S105). This is because sequential data of approximately intermediate size (e.g., between logical page size and physical page size) will be received.

When the scheduled amount of receptions corresponds to less than or equal to the size of the physical page 600 (S104: No), the write method determination unit 530 sets the write method as the horizontal write (S106). This is because data with high randomness will be received.

The write method may be changed by reference to a threshold other than the size of a physical page. In addition, an N-channel return write other than N=9 may be selected according to the size of the data to be received.

After the write method is determined, the command processing unit 520 sets the execution management table 152 as described above.

Figure 19:
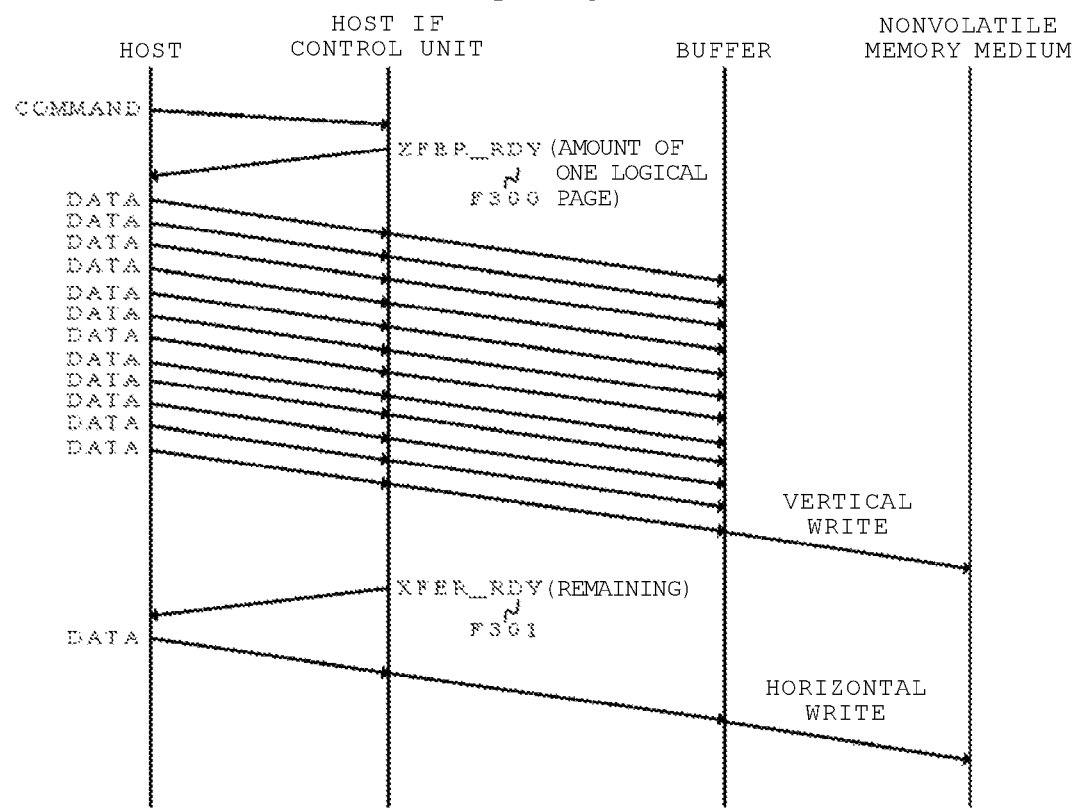
FIG. 19 is a sequence diagram illustrating determination of the write method according to the first embodiment.

The write method determination unit 530 sets the write method each time the XFER_RDY frame is transmitted. Other write methods may be employed for each XFER_RDY frame. For example, when the total amount of transfers requested by a write command corresponds to larger than a size of the logical page 630, data of the size of the logical page 630 is requested to the host 2 with an initial XFER_RDY frame (F300) as illustrated in FIG. 19. Thereby, the received data is written to the NAND flash memory 20 by using the vertical write. Remaining data is requested with a next XFER_RDY frame (F301). Thereby, the received data is written to the NAND flash memory 20 by using the horizontal write.

Next, a configuration of the data packet generation unit 220 according to the present embodiment will be described with reference to FIG. 20.

The data packet generation unit 220 divides the data received from the host IF control unit 100 into a packet size (4 kB). If one cluster of data is received, the data packet generation unit 220 increases a write counter 222. If one logical page of data is received, the data packet generation unit 220 increases a logical page counter 224.

The data packet generation unit 220 receives the write method management table 650 from the write method management table storage unit 230. The data packet generation unit 220 receives a write data disposition table 660 from the write data disposition table storage unit 240.

Examples of the write data disposition table 660 are illustrated in FIG. 21A to FIG. 21C. In FIG. 21A to FIG. 21C, WtCnt indicates the sequence of data stored in the buffer 210 in a cluster unit, that is, indicates a value corresponding to the write counter 222. In addition, MCO indicates the MCO corresponding to each WtCnt. For the sake of convenience of drawing, each figure is illustrated as two tables. Actually, each table is one table with WtCnt=0 to 287.

A write data disposition table 660a illustrated in FIG. 21A is referred to at the time of the vertical write. A write data disposition table 660b illustrated in FIG. 21B is referred to at the time of the 9-channel return write. A write data disposition table 660c illustrated in FIG. 21C is referred to at the time of the horizontal write. The write data disposition table storage unit 240 may store the write data disposition table 660 for N-channel return write other than N=18 (vertical write), N=9, and N=1 (horizontal write).

Figure 20:
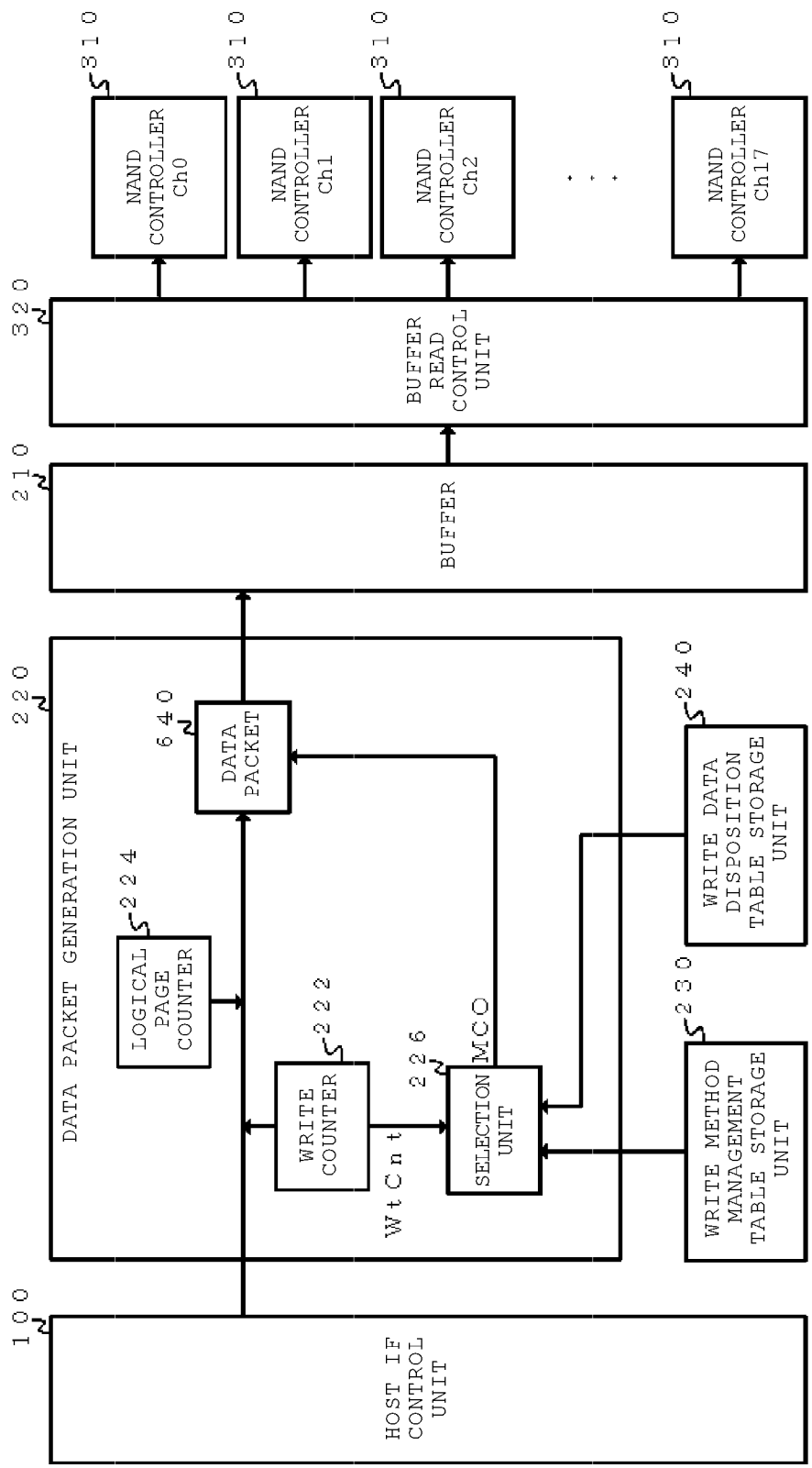
FIG. 20 is a block diagram of a data packet generation unit according to the first embodiment.

Description will be continued with reference to FIG. 20. The data packet generation unit 220 receives information as to the IPTT and the TPTT of the received data from the host IF control unit 100. The data packet generation unit 220 searches for the write method management table 650 on the basis of the IPTT and TPTT, and acquires a write method.

The data packet generation unit 220 refers to the write data disposition table 660 according to the acquired write method. In a case where the write method is the vertical write, the data packet generation unit 220 refers to the write data disposition table 660a. In a case where the write method is the 9-channel return write, the data packet generation unit 220 refers to the write data disposition table 660b. In a case where the write method is the horizontal write, the data packet generation unit 220 refers to the write data disposition table 660c. The data packet generation unit 220 searches for the write data disposition table 660 by using a value of the write counter 222 as an index, thereby, being able to determine MCO according to the write method.

In addition, the data packet generation unit 220 determines a buffer address on the basis of entry numbers of, for example, the write method management table 650. For example, the product of the entry number and ΔBuff18 may be used as a base address, and a value of the write counter 222 may be used as an offset address.

The data packet generation unit 220 generates the data packet 640 based on such information. The generated data packet 640 is stored in the buffer 210.

The buffer read control unit 320 determines timing when the data packet 640 is read from the buffer 210 and which NAND controller 310 receives the data packet 640, in accordance with the write method and the MCO in the data packet 640. Thereby, data write to the NAND flash memory 20 according to the write method can be performed.

According to the semiconductor memory device of the first embodiment described above, a write method is changed depending on a reception situation of write data, and thus, it is possible to improve sequential read performance, to prevent an empty space of a buffer from being depleted, and to improve performance of the semiconductor memory device.

Second Embodiment

As described in the first embodiment, the semiconductor memory device 1 can determine the TPTT of XFER_RDY frame to be a predetermined value. In addition, the host 2 has to include the TPTT received from the semiconductor memory device 1 in a DATA frame to transmit the DATA frame. In the present embodiment, the TPTT is set as a value according to the write method.

FIG. 22 illustrates an example of the TPTT which is transmitted in accordance with the present embodiment.

Bits 4 to 0 indicate a number of channels with which the channel-return write is carried out. That is, 18 is set at the time of vertical write, 9 is set at the time of 9-channel return write, and 1 is set at the time of horizontal write. Bits 7 to 5 correspond to entry numbers of the write method management table 650. Bits 15 to 8 may be any values. The bits 15 to 8 may be used as table numbers of, for example, the execution management table 152. The write method determination unit 530 determines the write method in the same manner as in the first embodiment. The command processing unit 520 sets the TPTT based on the determined write method in the execution management table 152.

By setting the TPTT as described above, the write method management table 650 is not required in the second embodiment. That is, the data packet generation unit 220 is notified of the TPTT of the data received from the host IF control unit 100 in the same manner as in the first embodiment. The data packet generation unit 220 can acquire a write method by the bits 4 to 0 in the notified TPTT. In addition, the data packet generation unit 220 can determine a buffer address on the basis of the bits 7 to 5 in the notified TPTT.

According to the semiconductor memory device of the second embodiment described above, a write method can be changed without a write method management table, and thus, it is possible to miniaturize the semiconductor memory device.

According to the semiconductor memory device of at least one embodiment described above, a write method is changed depending on a reception situation of write data, and thus, it is possible to improve sequential read performance, to prevent an empty space of a buffer from being depleted, and to improve performance of the semiconductor memory device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor storage device, comprising:
at least two nonvolatile semiconductor memories;
a buffer in which data received from a host and to be written to the nonvolatile memories in response to a write command received from the host can be temporarily stored; and
a controller connected to the nonvolatile semiconductor memories and configured to:
determine a scheduled amount of data to be received from the host in connection with the write command;
determine an identifier for the data on the basis of the determined amount;
transmit a transfer ready notification to the host that includes the determined identifier, the transfer ready notification indicating that the controller is ready to receive the scheduled amount of data from the host along with the identifier;
store the data transmitted from the host in the buffer;
on the basis of the identifier transmitted from the host along with the data, determine a number N of the nonvolatile semiconductor memories, N being greater than or equal to one and less than or equal to m, which is the number of the nonvolatile semiconductor memories connected to the controller; and
transfer the data stored in the buffer to the N nonvolatile semiconductor memories in parallel.

2. The semiconductor storage device according to claim 1, wherein
the controller sets the number N to be a first value when the scheduled amount of data to be received from the host is greater than a first threshold size, and sets the number N to be a second value less than the first value when the scheduled amount is smaller than the first threshold size.

3. The semiconductor storage device according to claim 2, wherein the first threshold size is equal to a first unit size for writing data to the nonvolatile semiconductor memories, multiplied by m.

4. The semiconductor storage device according to claim 2, wherein
the first threshold size is equal to a physical page size of the nonvolatile semiconductor memories.

5. The semiconductor storage device according to claim 1, wherein
the controller is further configured to notify the host of an amount of free space in the buffer.

6. The semiconductor storage device according to claim 1, wherein the buffer has a size that is equal to a first unit size for writing data to the nonvolatile semiconductor memories, multiplied by m.

7. The semiconductor storage device according to claim 1, wherein
a portion of the identifier indicates the number N set by the controller.

8. The semiconductor storage device according to claim 1, wherein the controller and the host communicate via a serial attached SCSI (SAS) protocol.

9. A method of writing data in a semiconductor storage device including m nonvolatile semiconductor memories, where m is two or more, said method comprising:
determining a scheduled amount of data to be received from a host in connection with a write command;
determining an identifier for the data on the basis of the determined amount;
transmitting a transfer ready notification to the host that includes the determined identifier, the transfer ready notification indicating that the semiconductor storage device is ready to receive the scheduled amount of data from the host along with the identifier;
storing, in a buffer, data received from the host and to be written to the nonvolatile memories;
on the basis of the identifier transmitted from the host along with the data, determining a number N of the nonvolatile semiconductor memories, N being greater than or equal to one and less than or equal to m; and
transferring the data stored in the buffer to the N nonvolatile semiconductor memories in parallel.

10. The method according to claim 9, further comprising:
setting the number N to be a first value when the scheduled amount is greater than a first threshold size; and
setting the number N to be a second value less than the first value when the scheduled amount is smaller than the first threshold size.

11. The method according to claim 10, wherein
the first threshold size is equal to a first unit size for writing data to the nonvolatile semiconductor memories, multiplied by m.

12. The method according to claim 10, wherein
the first threshold size is equal to a physical page size of the nonvolatile semiconductor memories.

13. The method according to claim 9, further comprising:
notifying the host of an amount of free space in the buffer.

14. The method according to claim 9, wherein the buffer has a size that is equal to the amount of data of a first unit size for writing data to the nonvolatile semiconductor memories, multiplied by m.

15. The method according to claim 9, wherein a portion of the identifier indicates the number N.

16. The method according to claim 9, wherein the semiconductor storage device and the host communicate via a serial attached SCSI (SAS) protocol.

* * * * *